United States Patent
Fox et al.

(10) Patent No.: US 10,527,147 B2
(45) Date of Patent: Jan. 7, 2020

(54) DIFFERENTIAL HAVING COMPACT BEVEL CROSS SHAFT RETENTION USING INTERNAL RETAINERS

(71) Applicant: Eaton Corporation, Cleveland, OH (US)

(72) Inventors: Matthew G. Fox, Ceresco, MI (US); Jeffrey A. Oesch, Roseville, MI (US)

(73) Assignee: Eaton Corporation, Cleveland, OH (US)

( * ) Notice: Subject to any disclaimer, the term of this patent is extended or adjusted under 35 U.S.C. 154(b) by 26 days.

(21) Appl. No.: 15/728,036

(22) Filed: Oct. 9, 2017

(65) Prior Publication Data

US 2018/0031101 A1    Feb. 1, 2018

Related U.S. Application Data

(63) Continuation of application No. 14/613,948, filed on Feb. 4, 2015, now Pat. No. 9,791,031, which is a
(Continued)

(51) Int. Cl.
*F16H 48/08*    (2006.01)
*F16H 48/22*    (2006.01)
(Continued)

(52) U.S. Cl.
CPC .............. *F16H 48/08* (2013.01); *F16H 3/54* (2013.01); *F16H 37/082* (2013.01); *F16H 48/22* (2013.01);
(Continued)

(58) Field of Classification Search
CPC ...... F16H 57/082; F16H 48/08; F16H 57/037; F16H 48/40; F16H 2048/087
(Continued)

(56) References Cited

U.S. PATENT DOCUMENTS

| 4,095,675 A | 6/1978 | Bell |
| 4,618,022 A | 10/1986 | Hayashi |

(Continued)

FOREIGN PATENT DOCUMENTS

| EP | 0182936 B1 | 6/1988 |
| GB | 1312720 A | 4/1973 |

(Continued)

*Primary Examiner* — Roger L Pang
(74) *Attorney, Agent, or Firm* — RMCK Law Group PLC

(57) ABSTRACT

A differential gear mechanism constructed in accordance to one example of the present disclosure can include a differential case, a clutch pack and a plurality of lock pins. The differential case can include a first differential case portion that defines a first output shaft opening and includes a plurality of clutch ear guides and a plurality of lock pin engaging surfaces. The clutch pack can include a plurality of annular plates that are interleaved between a plurality of annular friction disks. At least one of the annular plates and annular friction disks can include a plurality of radially extending plate ears that are received by the corresponding plurality of clutch ear guides. The plurality of lock pins can be received by the plurality of first lock pin engaging surfaces of the first differential case at locations in-line with the clutch ear guides.

8 Claims, 12 Drawing Sheets

Related U.S. Application Data continuation of application No. 14/049,513, filed on Oct. 9, 2013, now Pat. No. 8,951,159.

(60) Provisional application No. 61/870,832, filed on Aug. 28, 2013, provisional application No. 61/843,623, filed on Jul. 8, 2013, provisional application No. 61/843,592, filed on Jul. 8, 2013, provisional application No. 61/712,239, filed on Oct. 10, 2012.

(51) Int. Cl.
*F16H 3/54* (2006.01)
*F16H 37/08* (2006.01)
*F16H 48/40* (2012.01)
*F16H 57/037* (2012.01)
*F16H 1/28* (2006.01)
*F16H 48/32* (2012.01)
*F16D 13/52* (2006.01)

(52) U.S. Cl.
CPC ........... *F16H 48/40* (2013.01); *F16H 57/037* (2013.01); *F16D 13/52* (2013.01); *F16H 1/28* (2013.01); *F16H 48/32* (2013.01); *F16H 2048/085* (2013.01); *F16H 2048/087* (2013.01); *Y10T 74/2186* (2015.01)

(58) Field of Classification Search
USPC .................................................. 475/230, 331
See application file for complete search history.

(56) References Cited

U.S. PATENT DOCUMENTS

| | | | |
|---|---|---|---|
| 5,133,696 A | 7/1992 | Kobayashi | |
| 5,545,102 A * | 8/1996 | Burgman | F16H 37/082 475/230 |
| 5,839,327 A | 11/1998 | Gage | |
| 5,897,453 A | 4/1999 | Mimura | |
| 6,063,000 A | 5/2000 | Sugimoto | |
| 6,238,315 B1 | 5/2001 | Morse et al. | |
| 6,293,891 B1 | 9/2001 | Irwin et al. | |
| 6,503,167 B1 | 1/2003 | Sturm | |
| 6,692,396 B1 | 2/2004 | Grogg et al. | |
| 6,733,411 B1 | 5/2004 | Kaplan et al. | |
| 6,902,506 B2 | 6/2005 | Schrand | |
| 6,979,246 B2 * | 12/2005 | Chu | A63H 29/22 446/448 |
| 7,081,065 B2 * | 7/2006 | Sudou | F16H 48/08 475/230 |
| 7,318,511 B2 | 1/2008 | Grogg | |
| 7,341,136 B2 | 3/2008 | Park | |
| 7,353,927 B2 | 4/2008 | Park | |
| 7,448,482 B2 | 11/2008 | Park | |
| 7,695,392 B2 | 4/2010 | Dennis et al. | |
| 7,736,257 B2 * | 6/2010 | Nakajima | F16H 48/08 475/230 |
| 7,758,462 B2 | 7/2010 | Veldman et al. | |
| 7,942,780 B2 | 5/2011 | Donofrio et al. | |
| 8,167,763 B2 | 5/2012 | Curtis | |
| 8,216,106 B2 | 7/2012 | Curtis | |
| 8,430,780 B2 * | 4/2013 | Han | F16H 48/08 475/230 |
| 8,544,174 B2 | 10/2013 | Dennis et al. | |
| 8,591,375 B2 | 11/2013 | Maruyama et al. | |
| 2005/0009662 A1 | 1/2005 | Sudou | |
| 2010/0029434 A1 | 2/2010 | Nakajima et al. | |
| 2010/0323840 A1 | 12/2010 | Radzevich et al. | |
| 2013/0225356 A1 | 8/2013 | Tanaka et al. | |

FOREIGN PATENT DOCUMENTS

| | | |
|---|---|---|
| GB | 2237853 A | 5/1991 |
| JP | 2008045644 A | 2/2008 |

* cited by examiner

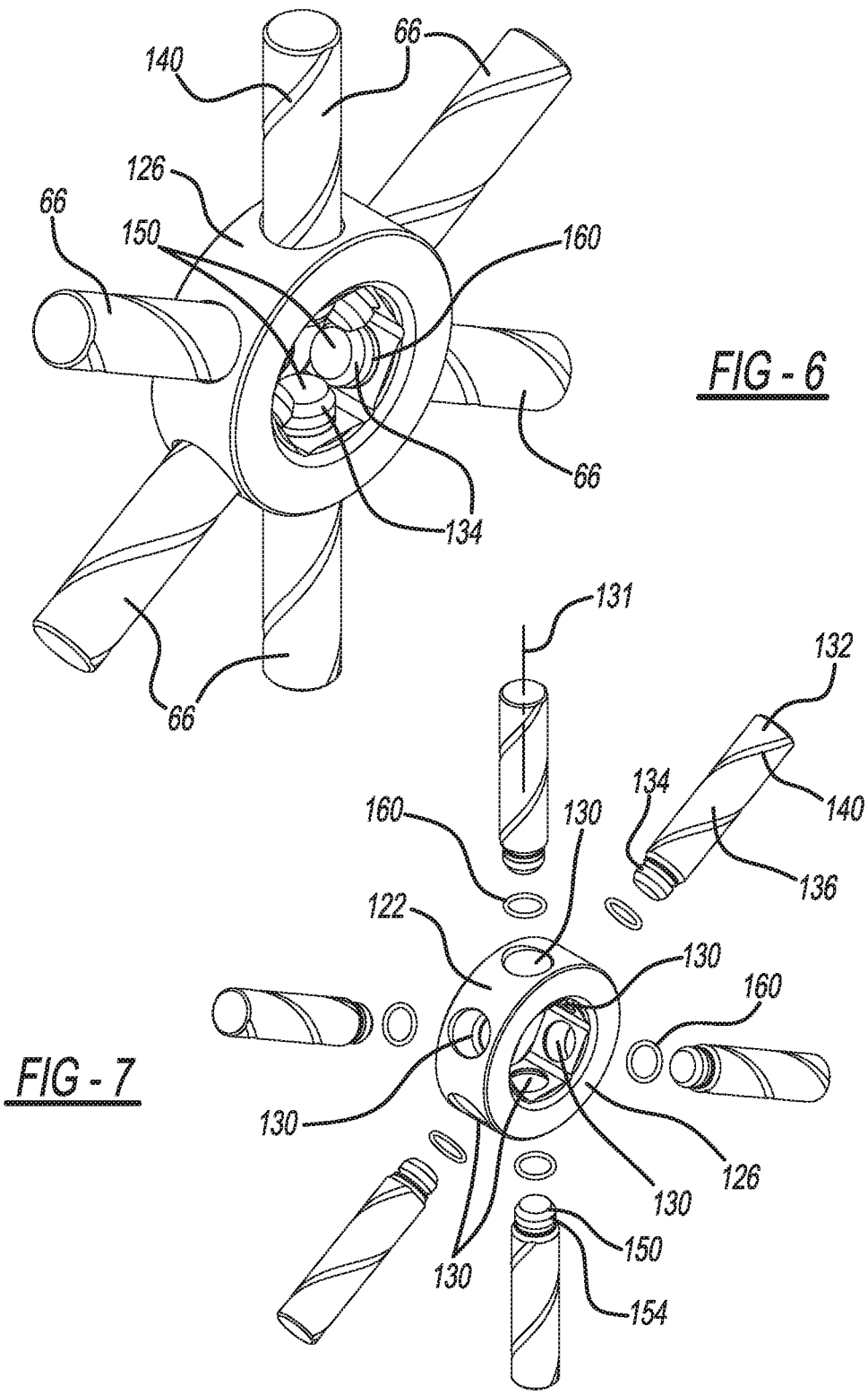

DIFFERENTIAL HAVING COMPACT BEVEL CROSS SHAFT RETENTION USING INTERNAL RETAINERS

CROSS-REFERENCE TO RELATED APPLICATIONS

This application is a continuation of U.S. patent application Ser. No. 14/613,948 filed Feb. 4, 2015, issued on Oct. 17, 2017 as U.S. Pat. No. 9,791,031, which is a continuation of U.S. patent application Ser. No. 14/049,513 filed Oct. 9, 2013, issued on Feb. 10, 2015 as U.S. Pat. No. 8,951,159, which claims the benefit of U.S. Patent Application Nos. 61/712,239 filed on Oct. 10, 2012, 61/843,592 filed on Jul. 8, 2013, 61/843,623 filed on Jul. 8, 2013, and 61/870,832 filed on Aug. 28, 2013. The disclosure of the above application is incorporated herein by reference.

FIELD

The present disclosure relates generally to differential gear assemblies and more particularly to a differential gear assembly having a cross shaft retaining configuration.

BACKGROUND

A differential gear mechanism can be provided in an axle assembly and used to transfer torque from a driveshaft to a pair of output shafts. The driveshaft can drive the differential through the use of a bevel gear that meshes with a ring gear mounted to a housing of the differential. In automotive applications, a differential allows the tires mounted at either end of the axle assembly to rotate at different speeds. This is important when the vehicle is turning because the outer tire travels over an arc of greater distance than the inner tire. Thus, the outer tire must rotate at a faster speed than the inner tire to compensate for the greater distance of travel. The differential includes a differential case and a gear arrangement that allows torque to be transferred from the driveshaft to the output shafts while concurrently allowing the output shafts to rotate at different speeds as needed. The gear arrangement can generally include a pair of side gears that are mounted for rotation with the respective output shafts. A series of cross pins or pinion gear shafts are fixedly mounted to the differential case for rotation therewith. A corresponding plurality of pinion gears are mounted for rotation with the pinion gear shafts and are in meshing relationship with both of the side gears.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A differential gear mechanism constructed in accordance to one example of the present disclosure can include a differential casing defining first and second output shaft openings that are coaxially aligned along an axis of rotation of the differential casing. First and second side gears are rotatably mounted within the differential casing. The first and second side gears can be co-axially aligned along the axis of rotation of the differential casing. The first side gear can define a first shaft opening configured to provide a first torque transmitting connection with a first output shaft received within the first output shaft opening. The second side gear can define a second shaft opening configured to provide a second torque transmitting connection with a second output shaft received within the second output shaft opening. A plurality of pinion gears can be mounted between the first and second side gears. Each of the plurality of pinion gears can be rotatably mounted on a respective pinion gear shaft. Each pinion gear shaft can have first and second ends. The first ends can be positioned for engagement with the differential casing. The plurality of pinion gears can be intermeshed with the first and second side gears to form a torque transfer arrangement configured for transferring torque between the pinion gears and the first and second side gears to rotate the first and second side gears about the axis of rotation. The torque transfer arrangement can be configured for allowing the first and second side gears to rotate at different rotational speeds with respect to one another about the axis of rotation. A retainer can be disposed within the differential casing that couples the second ends of the pinion gear shafts relative to each other.

According to additional features, the pinion gear shafts can comprise a plurality of single and independently formed pinion gear shafts for each pinion gear. In one example three pairs of pinion gear shafts are provided. Each pair of pinion gear shafts can include first and second pinion gear shafts that are coaxial relative to each other. In one example, the pinion gear shafts can include a groove formed along an outer circumferential surface.

According to other features, each second end of the pinion gear shafts has a distal tip including a distal end having a first outer diameter and a neck having a second outer diameter. The second outer diameter is less than the first outer diameter. The retainer can further include a center block defining a plurality of openings. Each pinion gear shaft can have a snap ring arranged around the neck. Each snap ring can be configured to compress during installation through the openings and subsequently expand upon clearing the openings thereby locking the pinion shafts into the center block. The distal tips can be bulbous. Each pinion gear shaft can extend along a pinion gear axis and further comprise an intermediate portion that connects the first and second ends. The intermediate portion can have a third outer diameter that is greater than the first outer diameter.

In other configurations, the retainer can comprise a first retainer portion and a second retainer portion. The first and second retainer portions can oppose each other and cooperatively engage the respective distal tips of the pinion gear shafts. The retainer can inhibit movement of the respective pinion gear shafts along respective pinion gear axes while permitting rotational movement about the respective pinion gear axes. The retainer can further comprise a connecting member that couples the first and second retainer portions together. The connecting member can include a screw that threadably engages at least one of the first and second retainer portions. In another example, the connecting member comprises a rivet.

BRIEF DESCRIPTION OF THE DRAWINGS

The present disclosure will become more fully understood from the detailed description and the accompanying drawings, wherein:

FIG. 6 is a perspective view of a retainer constructed in accordance to one example of the present disclosure and shown retaining a plurality of pinion gear shafts;

FIG. 7 is an exploded perspective view of the retainer and pinion gear shafts of FIG. 6;

DETAILED DESCRIPTION

Figure 1:
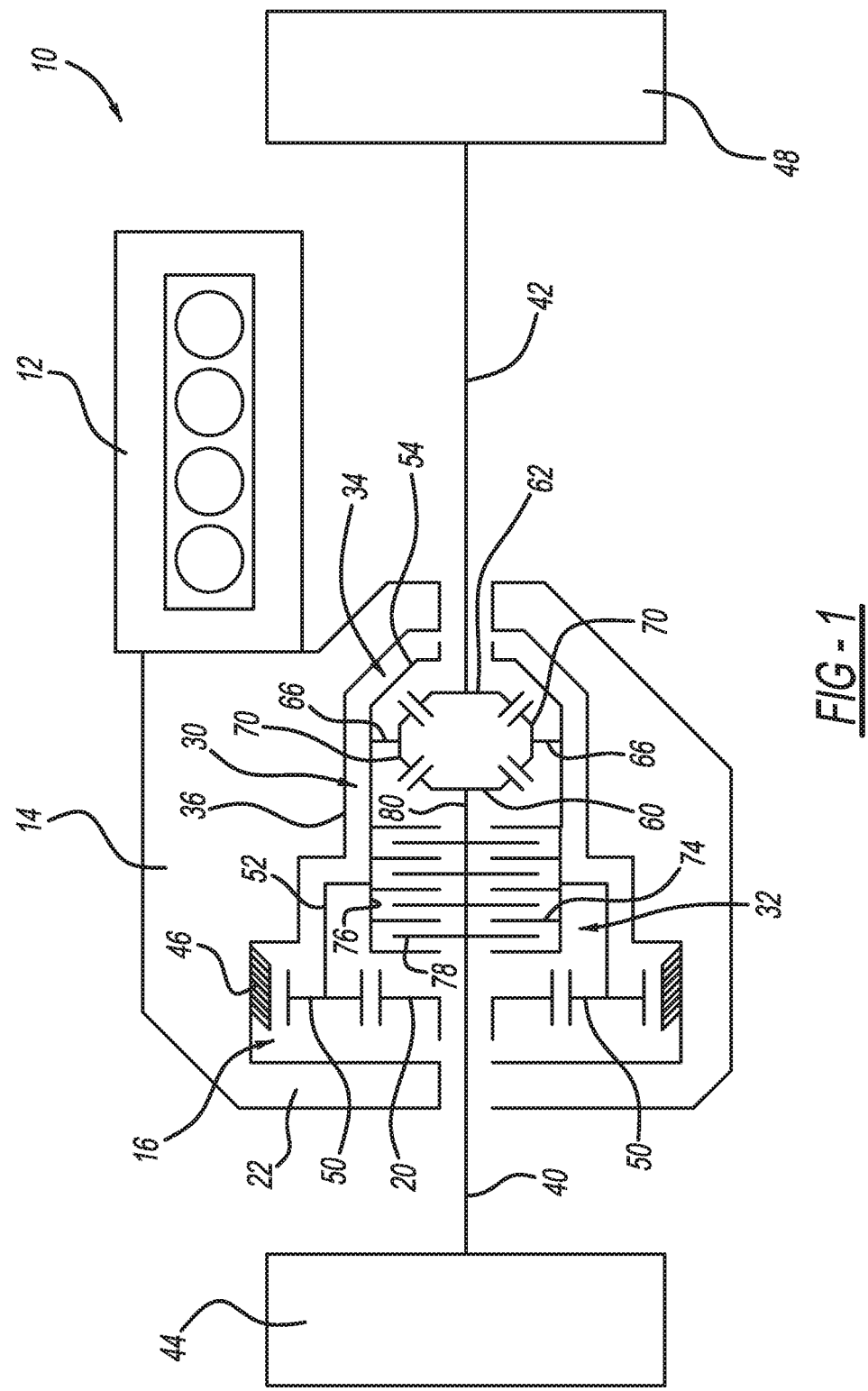
FIG. 1 is schematic of an exemplary vehicle driveline incorporating a differential gear mechanism constructed in accordance to one example of the present disclosure.
Figure 2:
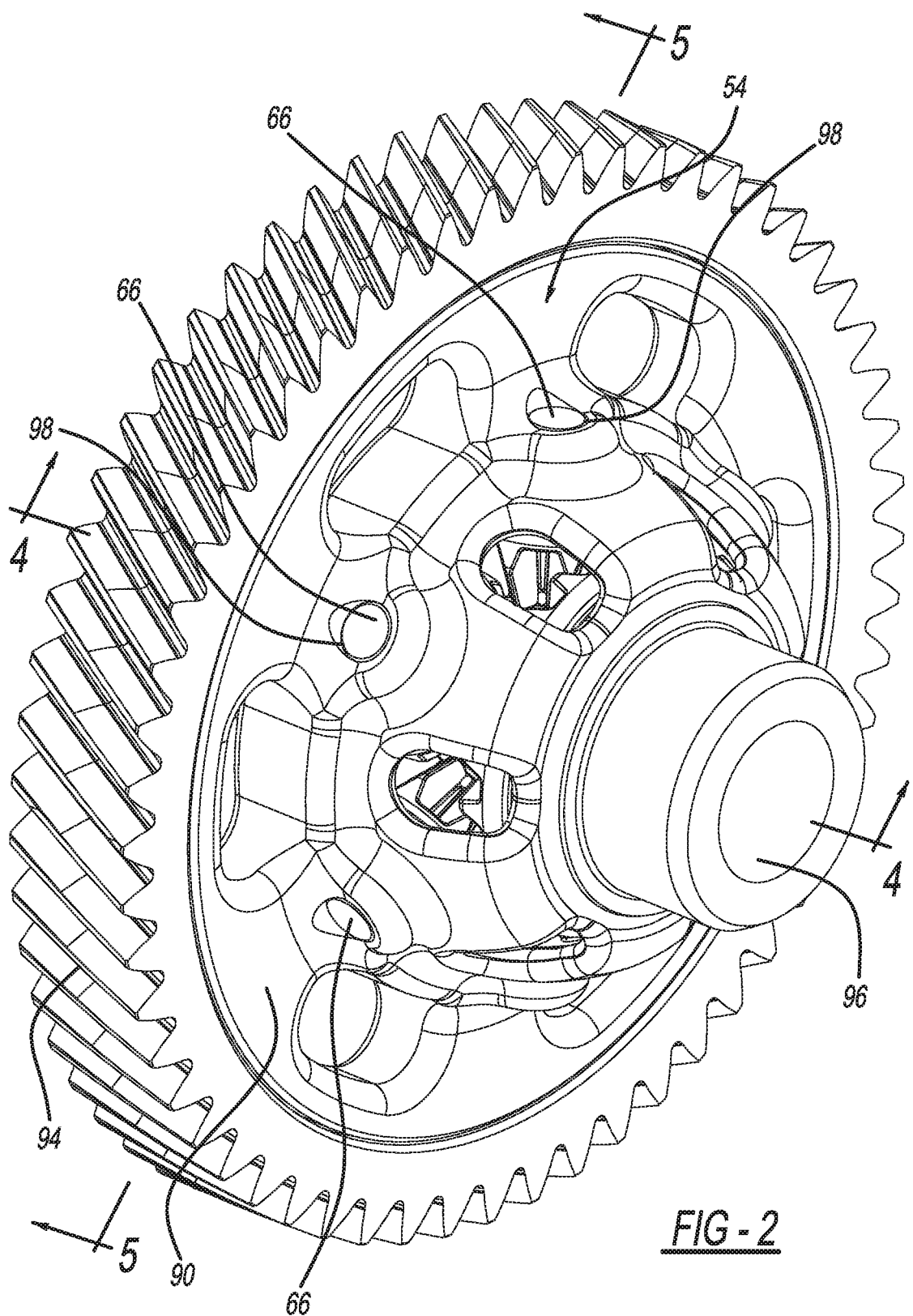
FIG. 2 is perspective view of a differential gear assembly of FIG. 1.

With initial reference to FIG. 1, an exemplary vehicle driveline is shown and generally identified with reference numeral 10. The exemplary vehicle driveline 10 described herein is for a front wheel drive vehicle having a transversely mounted engine 12, although other configurations can be utilized with the present disclosure. The engine 12 provides a rotary output to a transmission 14.

The driveline 10 can further include a transaxle 22 and a limited slip differential assembly 30 having a planetary gear assembly 16, a clutch assembly 32 and a differential gear assembly 34. The limited slip differential assembly 30 is received in a housing 36 and operates to drive a pair of axle shafts 40 and 42 that are connected to front drive wheels 44 and 48, respectively. In general, the limited slip differential assembly 30 functions as a traditional open differential during normal operating conditions until an event occurs where a bias torque is required. When a loss in traction is detected or anticipated, the clutch assembly 32 can be selectively actuated in order to generate the optimum bias ratio for the situation.

The transmission 14 can receive the rotary output from the engine 12 and provide a rotary input to the limited slip differential assembly 30. Further, the transmission 14 can be operable to provide various gear ratios between the rotary output of the engine 12 and the rotary input of the limited slip differential assembly 30.

The planetary gear assembly 16 includes a ring gear 46, a sun gear 20 and a plurality of planet gears 50 carried by a planet carrier 52. The ring gear 46 is non-rotatably fixed to the housing 36, and the sun gear 20 is meshingly engaged with the plurality of planet gears 50 carried by the planet carrier 52. The planet gears 50 are meshed with the ring gear 46. The planet carrier 52 is coupled for rotation with a differential case 54 of the differential gear assembly 34. The planetary gear assembly 16 provides a gear ratio reduction from the sun gear 20 to the planetary carrier 52 and, therefore, to the differential case 54. The sun gear 20 is rotatably coupled to the transmission 14 via a coupling device, such as a chain or belt, such that an output of the transmission 14 drivingly rotates the sun gear 20, which translates rotational output from the transmission 14 into rotational input of the sun gear 20.

Figure 3:
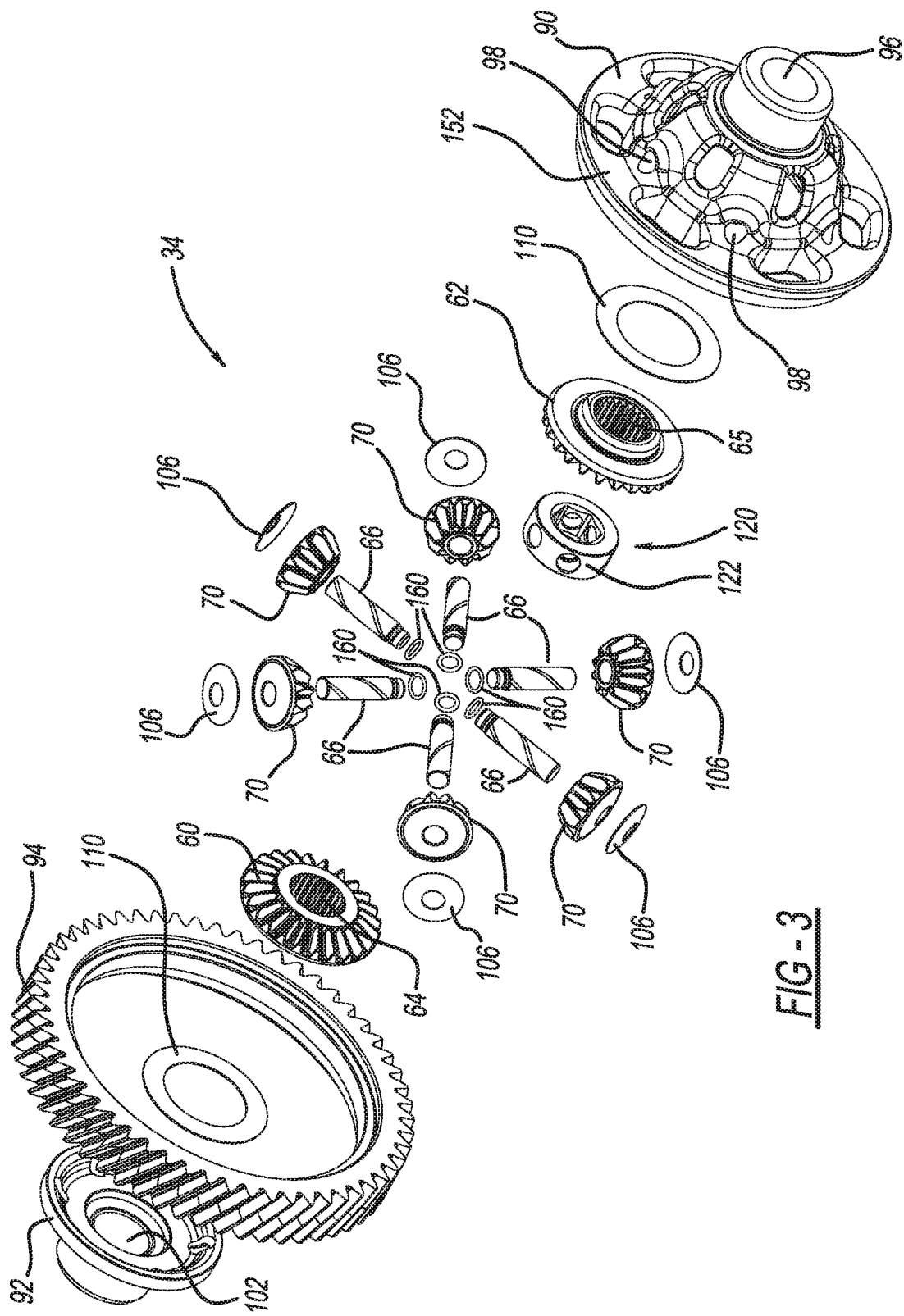
FIG. 3 is an exploded perspective view of the differential gear assembly of FIG. 2.
Figure 4:
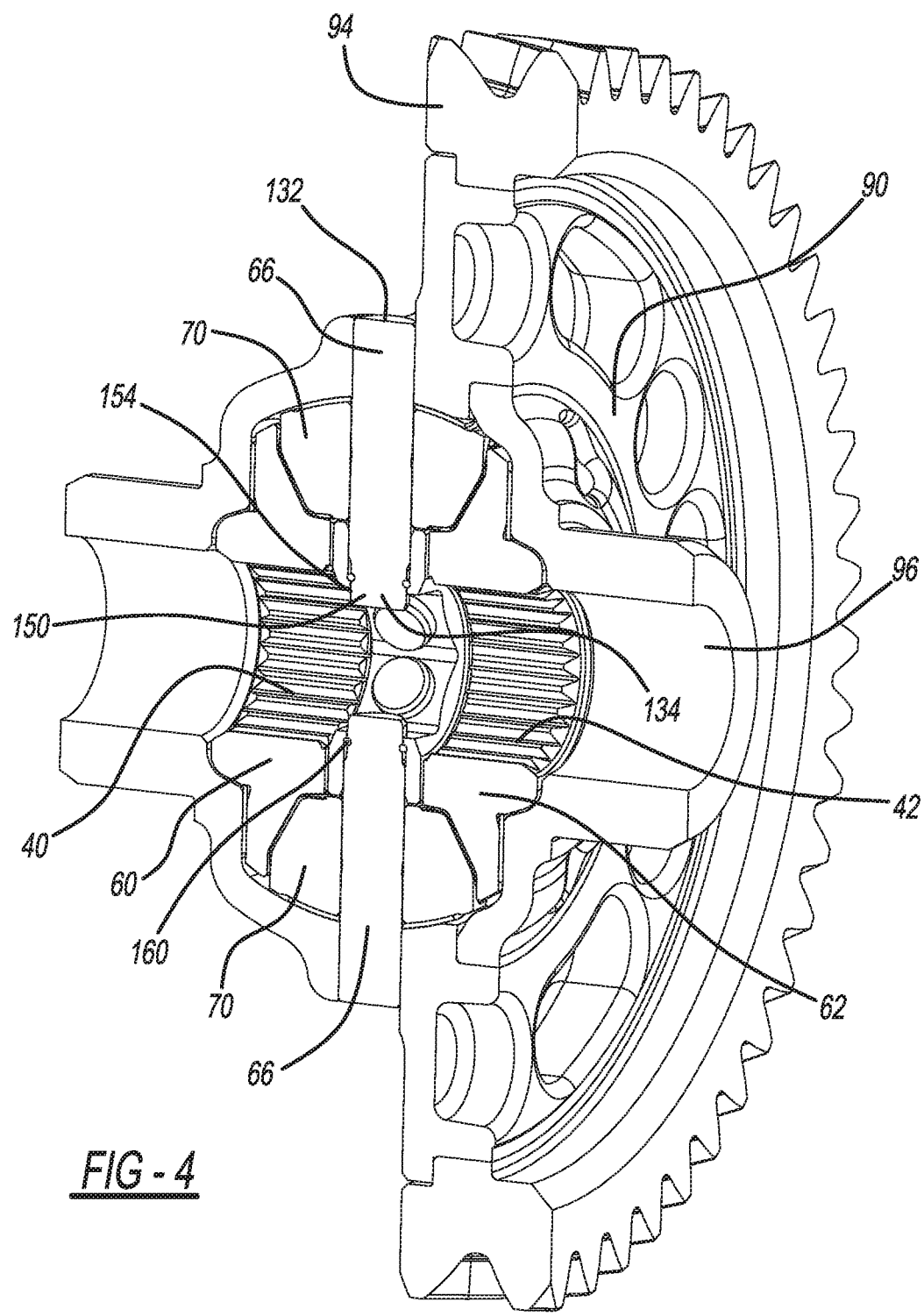
FIG. 4 is a cross-sectional view of the differential gear assembly taken along lines 4-4 of FIG. 2.

The differential gear assembly 34 includes a pair of side gears 60 and 62 that are mounted for rotation with the axle shafts 40 and 42 (and first and second drive wheels 44 and 48), respectively. The side gears 60 and 62 define first and second axle shaft openings 64 and 65 (FIG. 3). A plurality of cross pins or pinion gear shafts 66 are fixedly mounted to the differential case 54 for rotation therewith. A corresponding plurality of pinion gears 70 are mounted for rotation with the pinion gear shafts 66 and are in meshing relationship with both of the side gears 60 and 62. In an open configuration, described more fully below, the differential gear assembly 34 acts to allow the axle shafts 40 and 42 to rotate at different speeds.

The clutch assembly 32 couples the planetary gear assembly 16 with the differential gear assembly 34. The clutch assembly 32 includes a clutch pack and a clutch actuator. The clutch pack includes a plurality of annular plates 74 interleaved between a plurality of annular friction disks 78. The plurality of annular plates 74 can be coupled for rotation with one of the differential case 54 and the differential gear assembly 34. The plurality of annular friction disks 78 can be coupled for rotation with the other one of the differential case 54 and the differential gear assembly 34. In the illustrated embodiment, the plurality of annular plates 74 are coupled for rotation to the differential case 54 (e.g., splined to an inner diameter 76 of the differential case 54) and the plurality of annular friction disks 78 are coupled for rotation with the differential gear assembly 34 (e.g., splined to an outer diameter 80 of the side gear 60). It will be appreciated that the annular friction disks 78 may be supported for rotation by either of the side gears 60 or 62, or both.

The plurality of annular plates 74 and annular friction disks 78 are interleaved between one another and act to rotate past one another in substantially non-contacting relationship when the clutch assembly 32 is in its open position. However, it will be appreciated by those skilled in the art that the term "non-contacting" as used herein is relative and is not meant to necessarily indicate that the annular plates 74 and annular friction disks 78 have absolutely no contact when the clutch assembly 32 is in the open condition. The annular plates 74 and annular friction disks 78 are axially movable into frictional engagement relative to one another, thereby reducing relative rotation between the annular plates 74 and annular friction disks 78 when the clutch assembly 32 is in the closed or partially closed configurations. In this manner, when the clutch assembly 32 is in its closed position, the side gears 60 and 62, as well as the axle shafts 40 and 42 and the drive wheels 44 and 48 rotate together.

The clutch assembly 32 can operate in an open configuration to allow the side gears 60 and 62 to rotate independently from each other, e.g., at different speeds. The clutch assembly 32 can also operate in a closed or partially closed configuration where the side gears 60 and 62 rotate together or partially together (that is, not independently), e.g., at substantially the same speed. The clutch assembly 32 can, for example, be a hydraulic clutch assembly 32 that utilizes pressurized hydraulic fluid to selectively actuate the clutch pack between the open, closed and partially closed configurations.

With additional reference now to FIGS. 2-7, additional features of the differential gear assembly 34 will be described. The differential case 54 can include a first differential casing portion 90 and a second differential casing portion 92. A ring gear 94 can be disposed around the first differential casing portion 90. The first differential casing portion 90 can include a first axle hub 96. A plurality of bores 98 are defined in the first differential casing portion 90. The second differential case portion 92 can include a second axle hub 102. A plurality of rings 106 can be provided between the respective pinion gears 70 and the first differential casing portion 90. Washers 110 can be disposed outboard of the side gears 60 and 62.

A retainer 120 can be disposed in the differential case 54. The retainer 120 can retain the respective pinion shafts 66 relative to each other and within the differential case 54. The retainer 120 can include a center block 122. The center block 122 can include a ring-shaped member 126 that defines a plurality of openings 130 (FIG. 7).

Each pinion shaft 66 can extend along a pinion gear axis 131 (FIG. 7). Each pinion shaft 66 can generally include a first end 132, a second end 134 and an intermediate portion 136 that connects the first and second ends 132 and 134. Each pinion shaft 66 can define a spiral groove 140 formed along an outer circumferential surface. The spiral groove 140 can facilitate oil flowing along the length of the pinion shafts 66. Each second end 134 has a distal tip or end 150 having a first outer diameter 152 (FIG. 5) and a neck 154 having a second outer diameter 156. The second outer diameter 156 is less that the first outer diameter 152. The intermediate portion 136 has a third outer diameter 158. The first outer diameter 152 is less than the third outer diameter 158.

Figure 5:
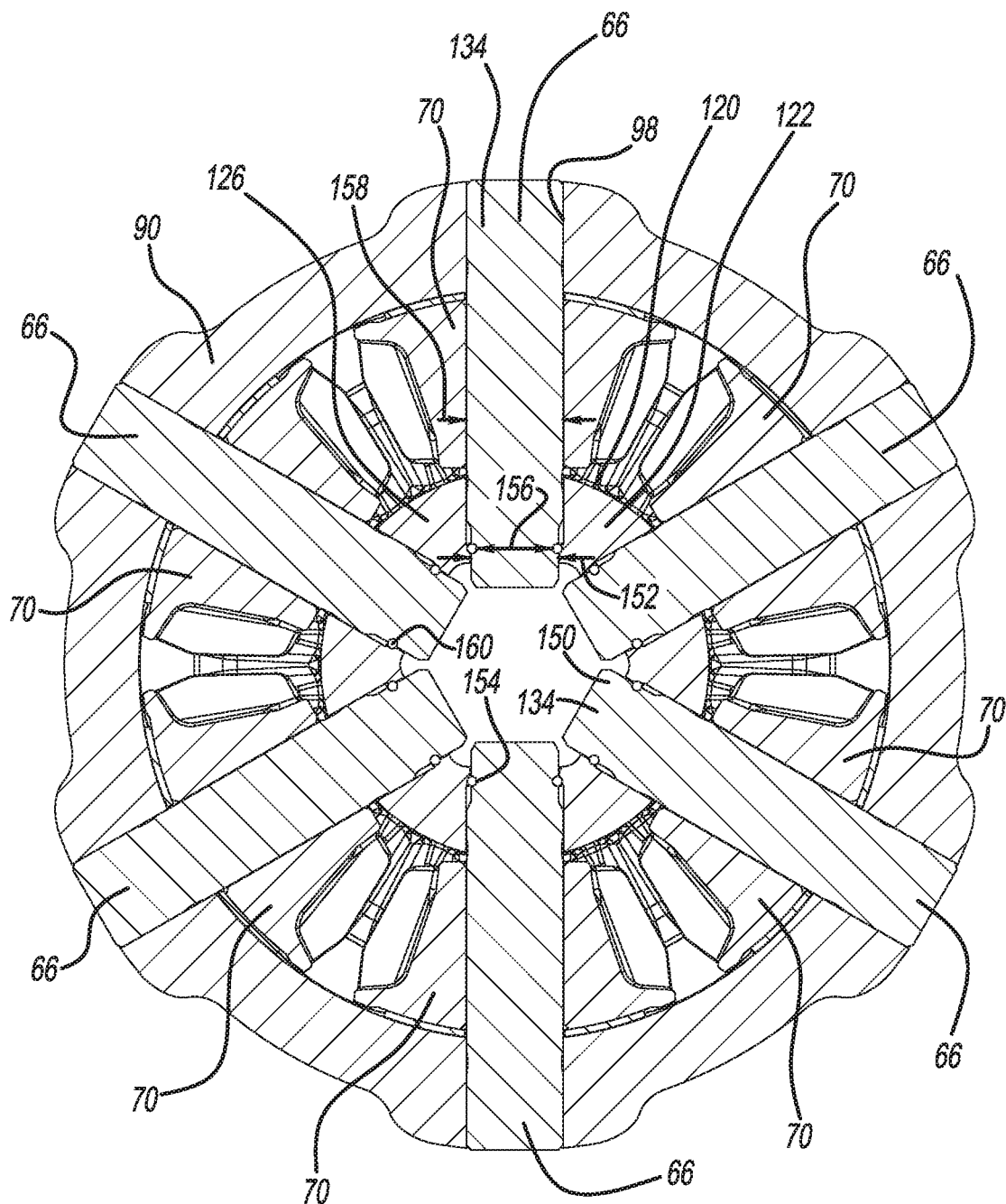
FIG. 5 is a cross-sectional view of the differential gear assembly taken along lines 5-5 of FIG. 2.

A snap ring or bang ring 160 is arranged around each neck 154. In one example, the pinion shafts 66 can be installed through the bores 98 and into the first differential casing 54. During installation, each snap ring 160 can compress during installation through the openings 130 of the center block 122 and subsequently expand (FIGS. 5 and 6) thereby locking the pinion shafts 66 axially. Explained further, the snap rings 160 can expand to a greater outer diameter than the openings 130 while still being journaled around the neck 154 thereby inhibiting axial movement of the pinion shafts 66. The center block 122 can be hardened and provide the necessary lead in geometry (radial ramp etc.) at the openings 130 to influence each snap ring 160 to compress as they are inserted. In one configuration, the pinion shafts 66 are free to rotate around their axes 131 subsequent to assembly into the retainer 120. The second ends 134 of the pinion shafts 66 can align with the bores 98 (FIG. 5).

Figure 8:
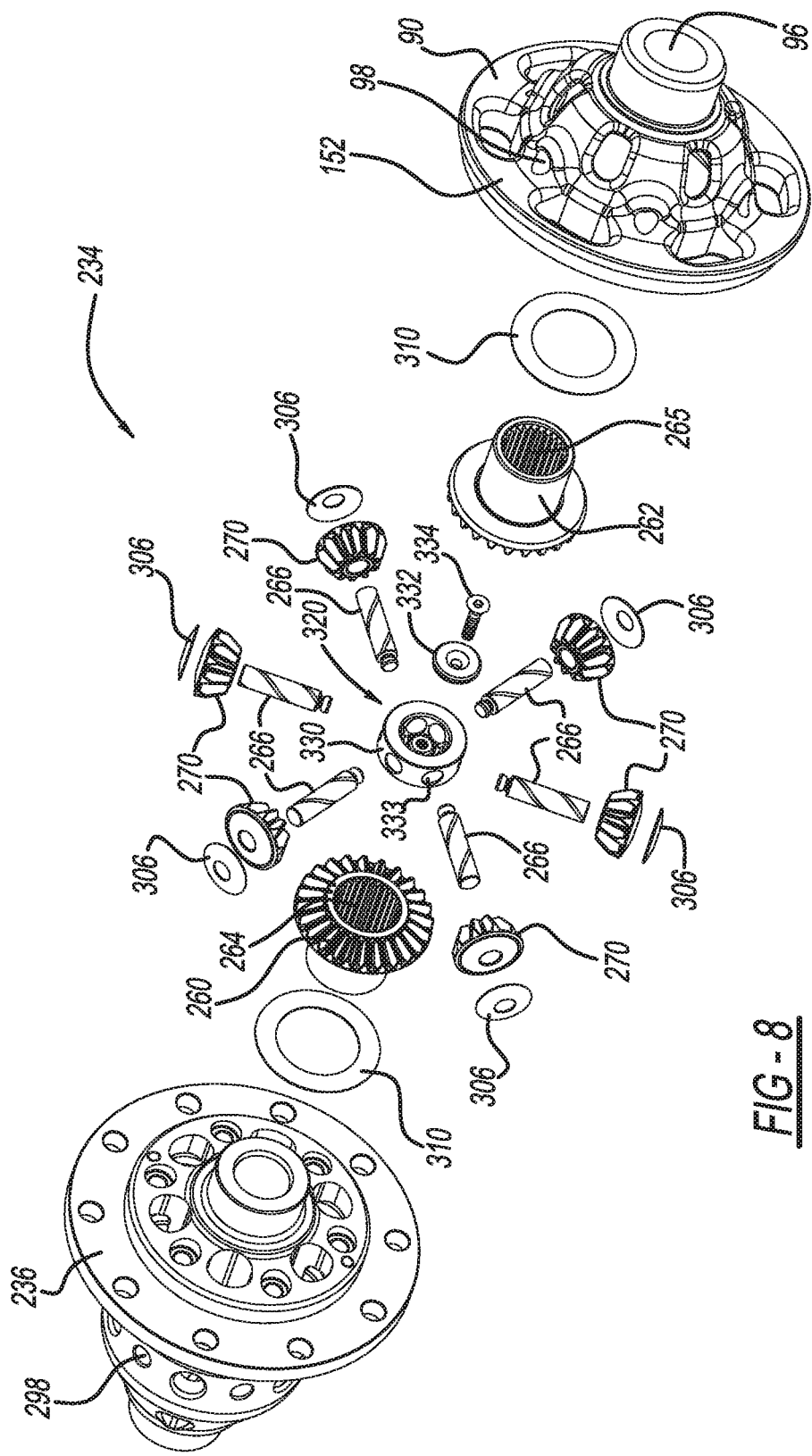
FIG. 8 is a perspective view of a retainer constructed in accordance to another example of the present disclosure and shown retaining a plurality of pinion gear shafts.
Figure 9:
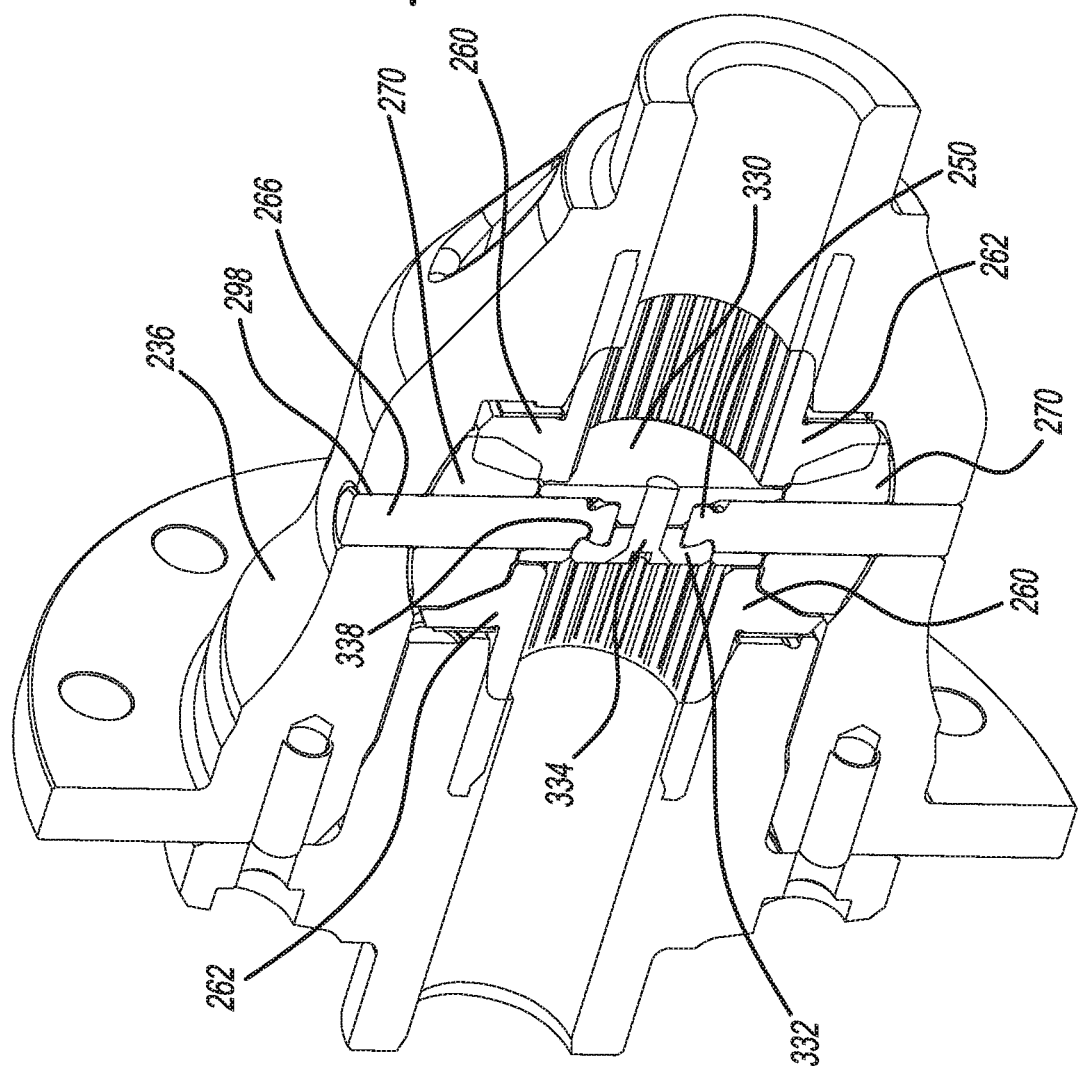
FIG. 9 is a cross-sectional view of the differential gear mechanism of FIG. 8.

With reference now to FIGS. 8 and 9 a differential gear assembly 234 constructed in accordance to additional features will be described. The differential gear assembly 234 has a differential case 236. The differential gear assembly 234 further includes a pair of side gears 260 and 262 having first and second shaft openings 264 and 265, respectively. A plurality of cross pins or pinion gear shafts 266 are fixedly mounted to the differential case 236 for rotation therewith. A corresponding plurality of pinion gears 270 are mounted for rotation with the pinion gear shafts 266 and are in meshing relationship with both of the side gears 260 and 262. The differential gear assembly 234 operates similar to the differential gear assembly 34 discussed above.

A plurality of bores 298 are defined in the differential case 236 and are configured to receive the pinion gear shafts 266. A plurality of rings 306 can be provided between the respective pinion gears 270 and the differential case 236. Washers 310 can be disposed outboard of the side gears 260 and 262.

A retainer 320 can be disposed in the differential case 236. The retainer 320 can retain the respective pinion shafts 266 relative to each other and within the differential case 236. The retainer 320 can include a first retainer portion 330 and a second retainer portion 332. The first retainer portion 330 can define a plurality of bores 333 configured to receive the pinion shafts 266. A connecting member 334 can include a fastener that can selectively couple the first and second retainer portions 330 and 332 together. In one example, the connecting member 334 can threadably engage complementary threads on the first retainer portion 330. The second retainer portion 332 can have one or a series of retaining lips 338 that can be configured to overhang and capture the distal ends 250 of the respective pinion shafts 266.

Figure 10:
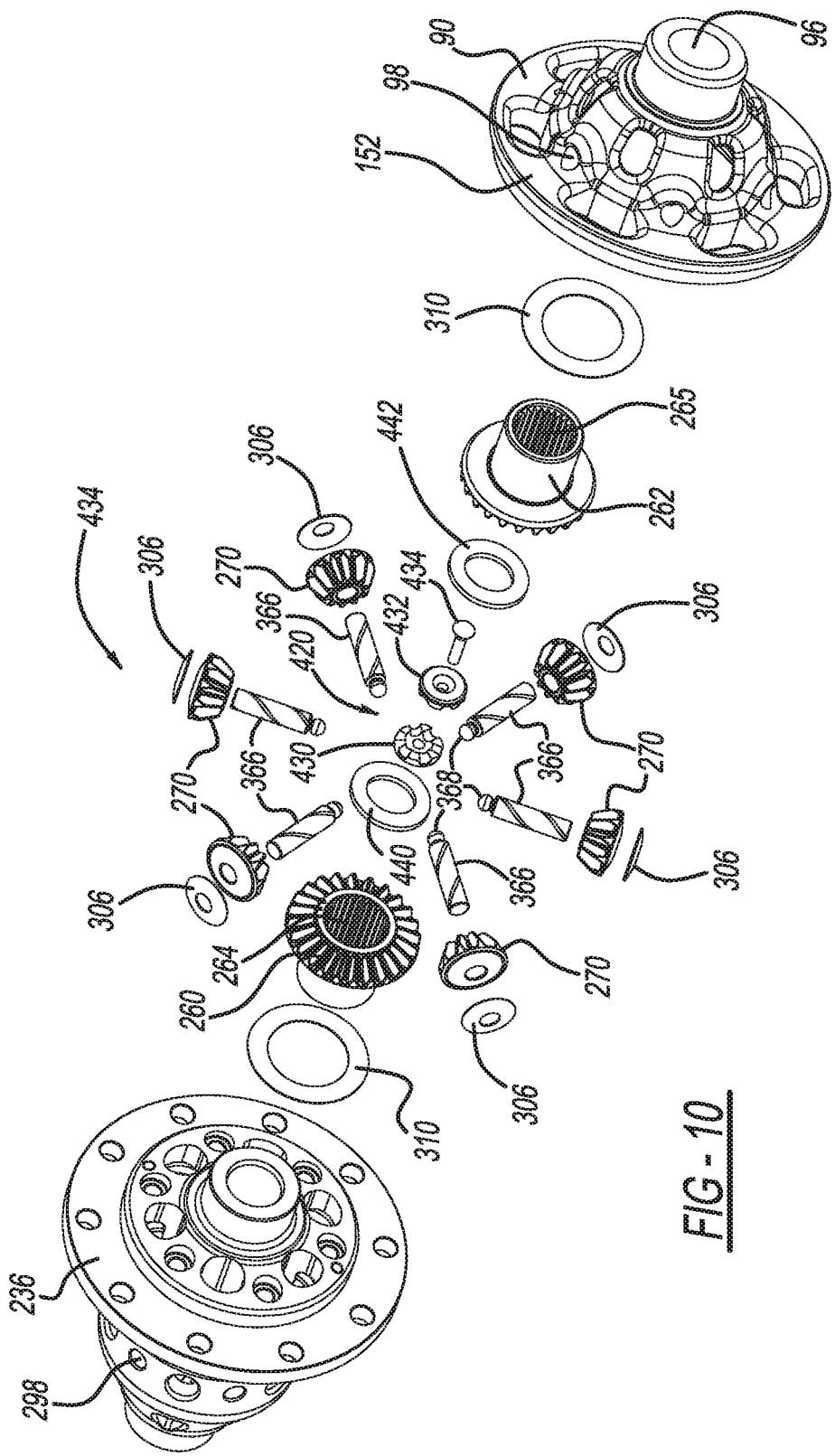
FIG. 10 is a perspective view of a retainer constructed in accordance to another example of the present disclosure and shown retaining a plurality of pinion gear shafts.
Figure 11:
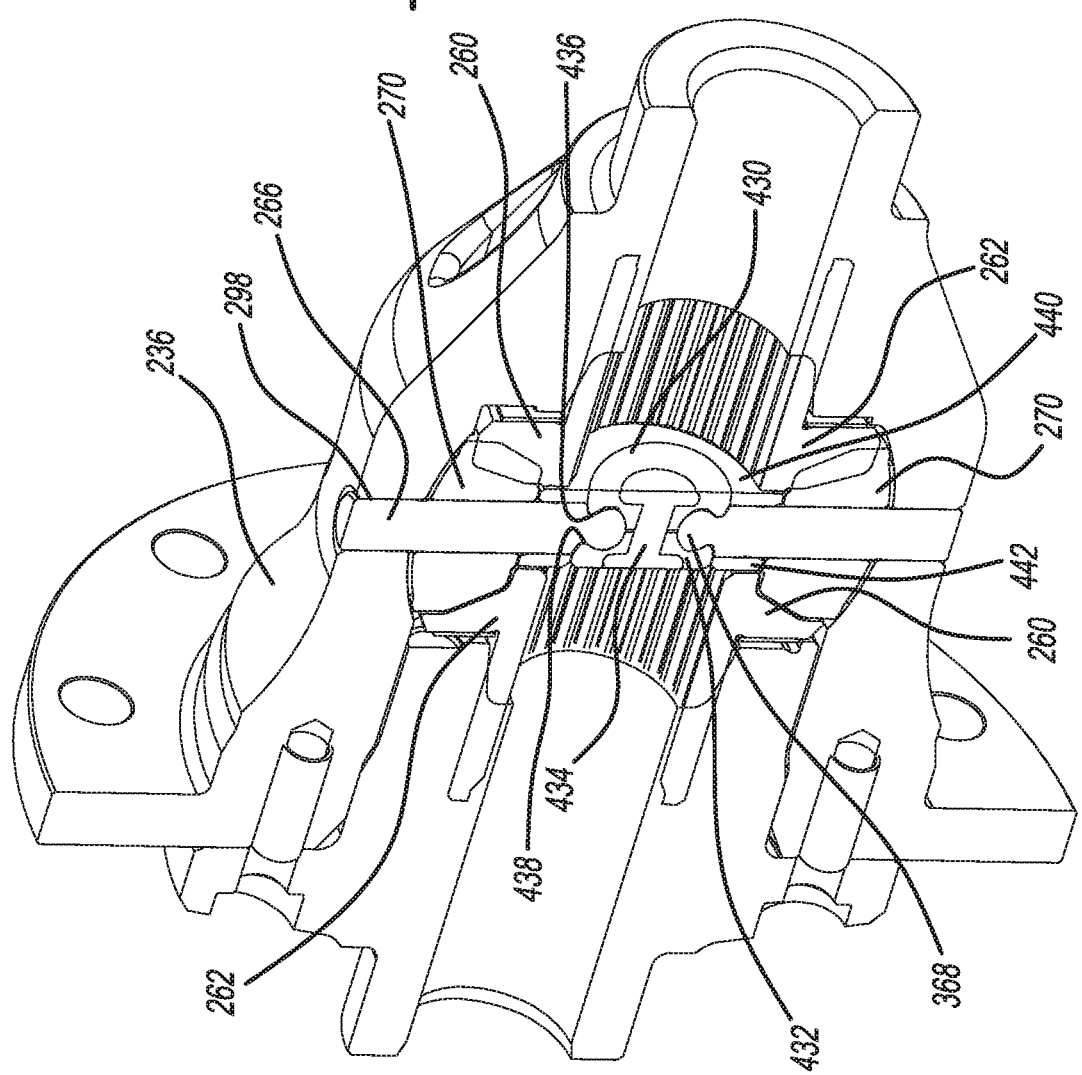
FIG. 11 is a cross-sectional view of the differential gear mechanism of FIG. 10.
Figure 12:
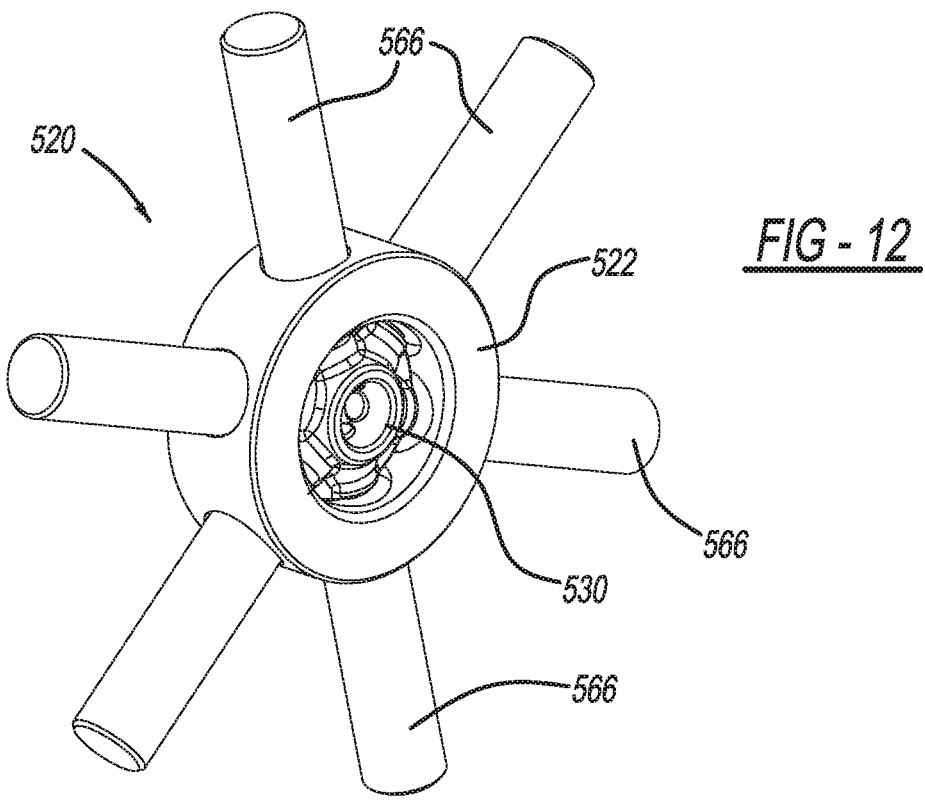
FIG. 12 is a perspective view of another retainer constructed in accordance to an additional example of the present disclosure and shown retaining a plurality of pinion gear shafts.
Figure 13:
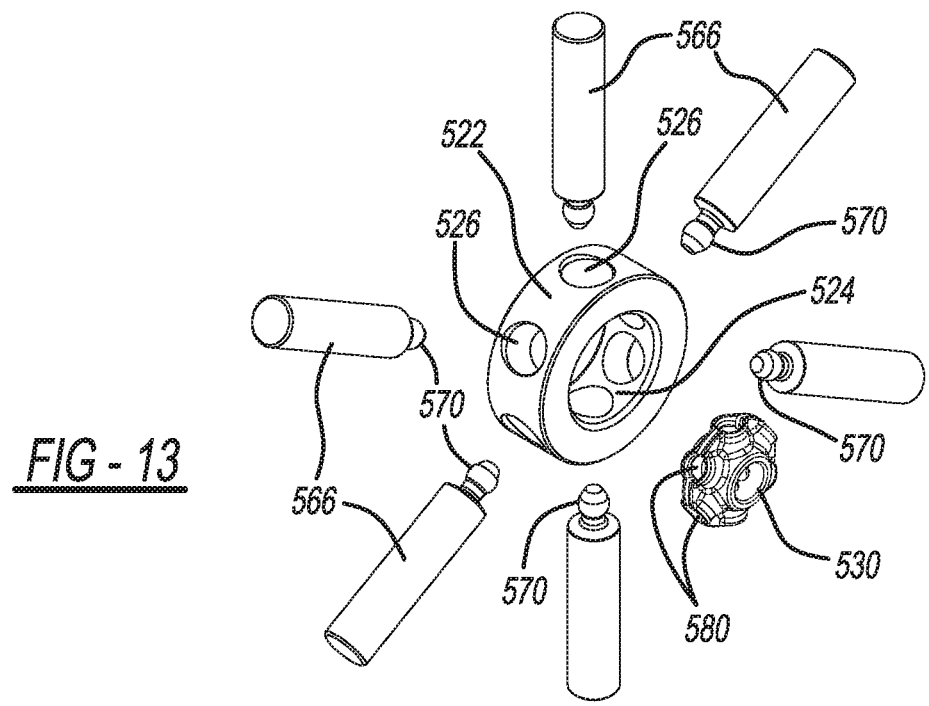
FIG. 13 is an exploded perspective view of the retainer and pinion gear shafts of FIG. 12.
Figure 14:
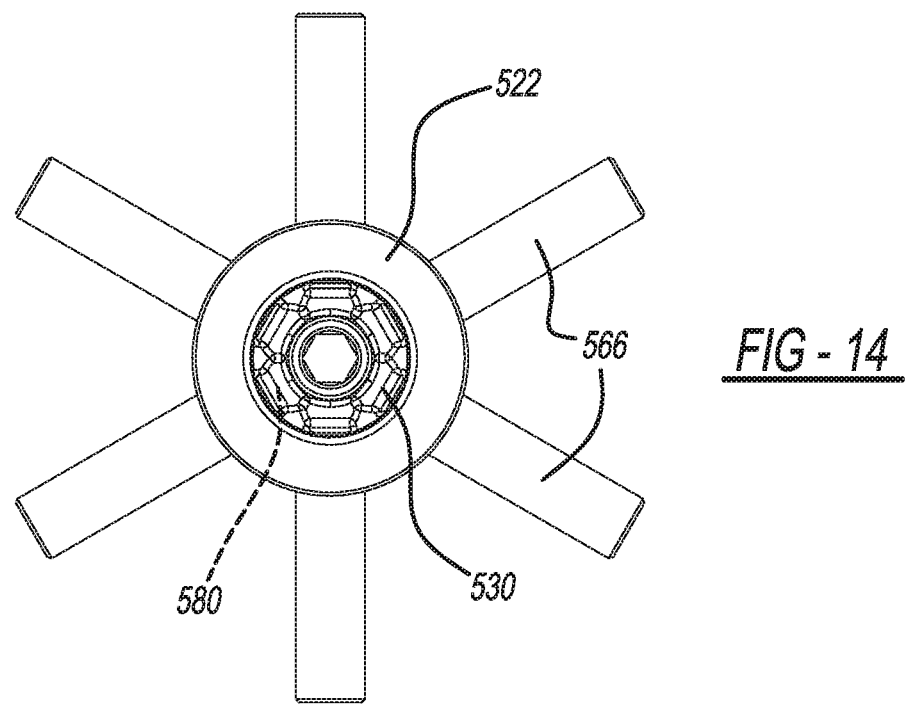
FIG. 14 is a plan view of the retainer and pinion gear shafts shown in FIG. 12.
Figure 15:
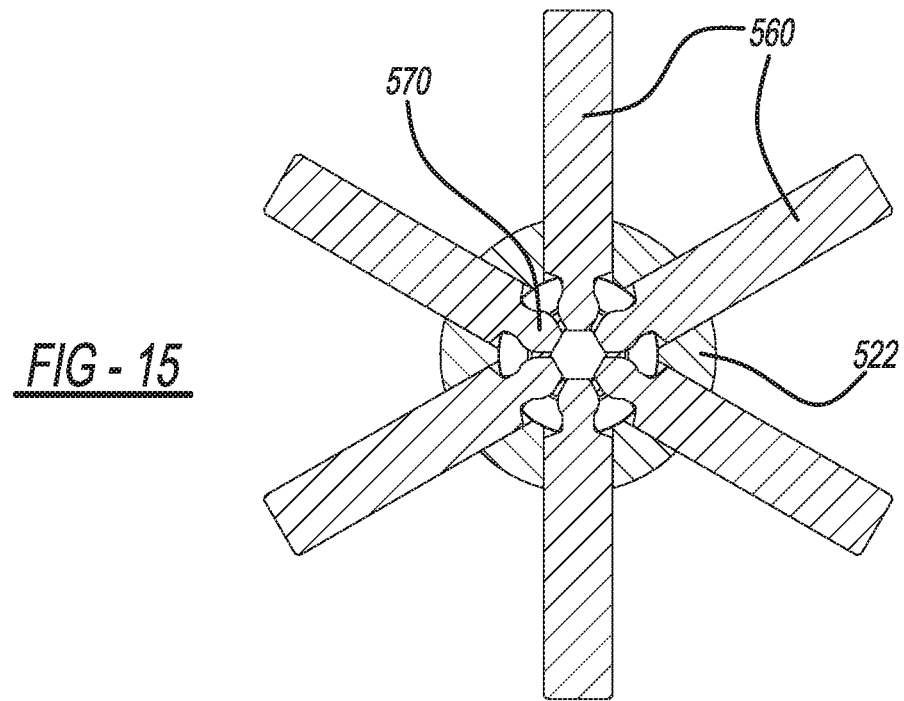
FIG. 15 is a sectional view of the retainer and pinion gear shafts shown in FIG. 14.

Turning now to FIGS. 10 and 11, a differential gear assembly 434 constructed in accordance to additional features will be described. The differential gear assembly 434 has a differential case 236. The differential gear assembly 434 further includes a pair of side gears 260 and 262 having first and second shaft openings 264 and 265, respectively. A plurality of cross pins or pinion gear shafts 366 are fixedly mounted to the differential case 236 for rotation therewith. The pinion gear shafts 366 can include distal ends 368. The distal ends 368 can be bulbous in one example. A corresponding plurality of pinion gears 270 are mounted for rotation with the pinion gear shafts 366 and are in meshing relationship with both of the side gears 260 and 262. A plurality of bores 298 are defined in the differential case 236. A plurality of rings 306 can be provided between the respective pinion gears 270 and the differential case 236. Washers 310 can be disposed outboard of the side gears 260 and 262. The differential gear assembly 334 operates similar to the differential gear assembly 34 discussed above.

A retainer 420 can be disposed in the differential case 236. The retainer 420 can retain the respective pinion shafts 366 relative to each other and within the differential case 236. The retainer 420 can include a first retainer portion 430 and a second retainer portion 432. A connecting member 434 can include a rivet that can selectively couple the first and second retainer portions 430 and 432 together. In one configuration, the rivet can include a buck rivet. The first and second retainer portions 430 and 432 can be positioned intermediate first and second disks 440 and 442. The first retainer portion 430 can have one or a series of retaining lips 436 that can be configured to overhang and capture the distal ends 368 of the respective pinion shafts 366. The second retainer portion 432 can have one or a series of retaining lips 438 that can be configured to overhang and capture the distal ends 368 of the respective pinion shafts 366.

With reference now to FIGS. 12-15, a retainer 520 constructed in accordance with additional features will be described. The retainer 520 can retain respective pinion shafts 566 relative to each other and within the differential case. The retainer 520 can include a center block 522 and a snap insert 530. The center block 522 can include a central opening 524 and a plurality of radial openings 526. The pinion shafts 566 can include a distal tip 570 that can be in the form of a ball, teardrop or other geometry. While not specifically shown, the pinion shafts 566 can include grooves formed along outer surfaces as described above with respect to the pinion shafts 66. The snap insert 530 can be received within the central opening 524 of the center block 522. The snap insert 530 can define a plurality of pockets 580. The distal tips 570 of the pinion shafts 566 are configured to expand the respective pockets 580 during insertion. The pockets 580 subsequently collapse around the distal tips 570 and retain the pinion shafts 566 in the retainer 520. The distal tips 570 can form a snap fit with the respective pockets 580 of the snap insert 530.

The foregoing description of the embodiments has been provided for purposes of illustration and description. It is not intended to be exhaustive or to limit the disclosure. For example, while the various retainers described herein for retaining pinion shafts have been described in relation with a front wheel drive limited slip differential, they are not so limited. In this regard, the retainers described herein can be used in any differential mechanism. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A differential gear mechanism comprising:
a differential casing defining first and second output shaft openings that are co-axially aligned along an axis of rotation of the differential casing;
a first and a second side gear rotatably mounted within the differential casing, the first and second side gears being co-axially aligned along the axis of rotation of the differential casing, the first side gear defining a first shaft opening configured to provide a first torque transmitting connection with a first output shaft received within the first output shaft opening, the second side gear defining a second shaft opening configured to provide a second torque transmitting connection with a second output shaft received within the second output shaft opening;
a plurality of pinion gears mounted between the first and second side gears, each of the plurality of pinion gears being rotatably mounted on a respective independently formed pinion gear shaft, each pinion gear shaft having first and second ends, the first ends positioned for engagement with the differential casing, the second ends each having a distal tip including a distal end having a first outer diameter and a neck having a second outer diameter, wherein the second outer diameter is less than the first outer diameter, the plurality of pinion gears intermeshing with the first and second side gears to form a torque transfer arrangement configured for transferring torque between the pinion gears and the first and second side gears to rotate the first and second side gears about the axis of rotation, the torque transfer arrangement also being configured for allowing the first and second side gears to rotate at different rotational speeds with respect to one another about the axis of rotation; and
a retainer disposed within the differential casing and that couples the second ends of the pinion gear shafts relative to each other.

2. The differential gear mechanism of claim 1 wherein the pinion gear shafts comprise three pair of pinion gear shafts, wherein each pair of pinion gear shafts includes first and second pinion gear shafts that are coaxial relative to each other.

3. The differential gear mechanism of claim 1 wherein at least one of the pinion gear shafts has a groove formed along an outer circumferential surface.

4. The differential gear mechanism of claim 1 wherein the retainer further comprises a center block defining a plurality of openings, wherein each pinion gear shaft has a snap ring arranged around the neck, each snap ring configured to compress during installation through the openings and subsequently expand upon clearing the openings thereby locking the pinion shafts into the center block.

5. The differential gear mechanism of claim 1 wherein the respective distal tips are bulbous.

6. The differential gear mechanism of claim 1 wherein each pinion gear shaft extends along a pinion gear axis and further comprises an intermediate portion that connects the first and second ends, the intermediate portion having a third outer diameter, wherein the first outer diameter is less than the third outer diameter.

7. A differential gear mechanism comprising:
a differential casing defining first and second output shaft openings that are co-axially aligned along an axis of rotation of the differential casing;
a first and a second side gear rotatably mounted within the differential casing, the first and second side gears being co-axially aligned along the axis of rotation of the differential casing, the first side gear defining a first shaft opening configured to provide a first torque transmitting connection with a first output shaft received within the first output shaft opening, the second side gear defining a second shaft opening configured to provide a second torque transmitting connection with a second output shaft received within the second output shaft opening;
a plurality of pinion gears mounted between the first and second side gears, each of the plurality of pinion gears being rotatably mounted on a respective, independently formed pinion gear shaft, each pinion gear shaft extending along a pinion gear shaft axis between first and second ends, the first ends engaging the differential casing, the second ends each having a distal tip including a distal end having a first outer diameter and a neck having a second outer diameter, wherein the second outer diameter is less than the first outer diameter; and
a retainer disposed within the differential casing and that engages the respective distal tips and inhibits movement of the pinion gear shafts along their respective pinion gear axes.

8. A differential gear mechanism comprising:
a differential casing defining first and second output shaft openings that are co-axially aligned along an axis of rotation of the differential casing;
a first and a second side gear rotatably mounted within the differential casing, the first and second side gears being co-axially aligned along the axis of rotation of the differential casing, the first side gear defining a first shaft opening configured to provide a first torque transmitting connection with a first output shaft received within the first output shaft opening, the second side gear defining a second shaft opening configured to provide a second torque transmitting connection with a second output shaft received within the second output shaft opening;
a plurality of pinion gears mounted between the first and second side gears, each of the plurality of pinion gears being rotatably mounted on a respective pinion gear shaft, each pinion gear shaft having first and second ends, the first ends engaging the differential casing, the second ends having a distal tip including a distal end having a first outer diameter and a neck having a second outer diameter, wherein the second outer diameter is less than the first outer diameter, the plurality of pinion gears intermeshing with the first and second side gears to form a torque transfer arrangement configured for transferring torque between the pinion gears and the first and second side gears to rotate the first and second side gears about the axis of rotation, the torque transfer arrangement also being configured for allowing the first and second side gears to rotate at different rotational speeds with respect to one another about the axis of rotation; and a retainer disposed within the differential casing and that couples to each of the distal tips of the pinion gear shafts at the neck thereby inhibiting axial movement of the respective pinion gear shafts.

* * * * *